(12) United States Patent
Kim (10) Patent No.: US 12,386,702 B2
(45) Date of Patent: Aug. 12, 2025

(54) ADAPTIVE ERROR RECOVERY WHEN PROGRAM STATUS FAILURE OCCURS IN A MEMORY DEVICE

(71) Applicant: Micron Technology, Inc., Boise, ID (US)

(72) Inventor: Kyungjin Kim, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 15 days.

(21) Appl. No.: 18/427,792

(22) Filed: Jan. 30, 2024

(65) Prior Publication Data

US 2024/0272983 A1 Aug. 15, 2024

Related U.S. Application Data

(60) Provisional application No. 63/485,182, filed on Feb. 15, 2023.

(51) Int. Cl.
*G06F 11/00* (2006.01)
*G06F 11/07* (2006.01)
*G06F 11/10* (2006.01)

(52) U.S. Cl.
CPC ........ *G06F 11/1076* (2013.01); *G06F 11/076* (2013.01); *G06F 11/1016* (2013.01)

(58) Field of Classification Search
CPC . G06F 11/1076; G06F 11/076; G06F 11/1016
See application file for complete search history.

(56) References Cited

U.S. PATENT DOCUMENTS

| | | | | |
|---|---|---|---|---|
| 8,365,030 B1 * | 1/2013 | Choi | ................... | G06F 11/1048 714/799 |
| 12,038,805 B1 * | 7/2024 | Zhang | ................... | G06F 11/076 |
| 2022/0336037 A1 * | 10/2022 | Noguchi | ................ | G11C 29/20 |

\* cited by examiner

*Primary Examiner* — Jason B Bryan
(74) *Attorney, Agent, or Firm* — Lowenstein Sandler LLP (57) ABSTRACT

A system and method for detecting a failure of a set of memory cells in a memory device, determining a recovery indicator associated the failure, the recovery indicator corresponding to a subset of cells of the set of memory cells, and the subset of cells having a threshold voltage above a read level, where the read level corresponds to a per-cell memory density of the plurality of cells of the memory device, determining a data recovery operation based on whether the recovery indicator satisfies a threshold condition, the threshold condition corresponding to the read level, and causing the data recovery operation to be performed on the set of memory cells.

20 Claims, 7 Drawing Sheets

ADAPTIVE ERROR RECOVERY WHEN PROGRAM STATUS FAILURE OCCURS IN A MEMORY DEVICE

CLAIM OF PRIORITY

The present application claims the benefit under 35 U.S.C. § 119(e) of U.S. Provisional Patent Application No. 63/485,182 filed Feb. 15, 2023, which is incorporated by this reference herein.

TECHNICAL FIELD

Embodiments of the disclosure relate generally to memory sub-systems, and more specifically, relate to adaptive error recovery when program status failure occurs in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to adaptive error recovery when program status failure occurs in a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Precisely controlling the amount of the electric charge stored by the memory cell allows establishing multiple logical levels, thus effectively allowing a single memory cell to store multiple bits of information. A read operation can be performed by comparing the measured threshold voltages (VT) exhibited by the memory cell to one or more reference voltage levels in order to distinguish between two logical levels for single-level cell (SLCs) and between multiple logical levels for cells with multiple levels. A memory device can include multiple portions, including, e.g., one or more portions where the sub-blocks are configured as SLC memory, one or more portions where the sub-blocks are configured as multi-level cell (MLC) memory that can store two bits of information per cell, and/or (triple-level cell) TLC memory that can store three bits of information per cell.

The voltage levels of the memory cells in TLC memory form a set of 8 programming distributions representing the 8 combinations of the three bits stored in each memory cell. Depending on how they are configured, each physical page in one of the sub-blocks can include multiple page types. For example, a physical page formed from single level cells (SLCs) has a single page type known as a lower logical page (LP). Multi-level cell (MLC) physical page types can include LPs and upper logical pages (UPs). TLC physical page types are LPs, UPS, and extra logical pages (XPs). Quad level cells (QLC) physical page types are LPs, UPs, XPs, and top logical pages (TPs). For example, a physical page formed from memory cells of the QLC memory type can have a total of four logical pages, where each logical page can store data distinct from the data stored in the other logical pages associated with that physical page. Each threshold voltage of a threshold voltage distribution corresponds to a logical page of the memory cell. For example, a first threshold (i.e., V1) and fifth threshold voltage (i.e., V5) correspond to LPs of the TLC; a second threshold voltage (i.e., V2), a fourth threshold voltage (i.e., V4), and a sixth threshold voltage (i.e., V6) correspond to UPs of the TLC; and a third threshold voltage (i.e., V3) and seventh threshold voltage (i.e., V7) correspond to XPs of the TLC.

Due to various physical phenomena and operational processes, such as slow charge loss and read disturb, charge levels of memory cells can degrade over time, thus causing higher error rates in memory read operations (e.g., at the "failed memory cells"). Read disturb is a phenomenon where reading data from a memory cell can cause the threshold voltage levels of unread memory cells in the same block to shift to different values. Slow charge loss is a phenomenon where the threshold voltage level of a memory cell changes over time as the electric charge of the memory cell is degrading. Data can be recovered from failed memory cells with read error handling (REH). REH can include operations such as read retry, coarse threshold estimation (CTE), auto read calibration (ARC), or soft-decision decoding (e.g., 1 hard bit (H)/2 soft bits (S) (1H2S)). The read error handling can recover data using an obtained read level. In some embodiments, the duration of REH (including data recovery) can generally be in the 10s of milliseconds (i.e., <100 ms).

When the failure at the failed memory cells is more severe, such as because of extreme slow charge loss or read disturb, interrupted program operations, etc., REH might be unable to recover data from the failed memory cells. When REH is unable to recover data from the failed memory cells, a more intensive recovery operation can be attempted. A Redundant Array of Independent Disks (RAID) recovery can successfully recover data from failed memory cells in some instances when REH fails. RAID recovery can include calculating subsequent reads from distributed recovery data such that data at the failed memory cells is not lost. Recovery data can block-level striped, and can include redundancy data (e.g., duplicate data, parity data), error detection data (e.g., error detection codes, checksums, Cyclic Redundancy Check (CRC)), error correction data (e.g., error correcting code (ECC), forward error correction (FEC), erasure code), other data, or a combination thereof. Recovery data can be distributed among portions of memory (e.g., through block-level striping). The duration of RAID recovery can be related to the quantity of memory cells in the memory device (e.g., RAID recovery can be longer on memory devices and/or memory dies with more memory cells). In some embodiments, the duration of RAID recovery can generally be in the 100s of milliseconds (i.e., <1000 ms).

During normal operation of a memory device, upon detecting a failure, a series of error handling operations can be attempted to identify and correct the failure. These error handling operations can also attempt to recover data stored at the failed memory cells. Operations can be applied in order from less intensive to more intensive. For example, to recover data from failed memory cells, a less intensive REH can precede a more intensive RAID recovery. In this way, more intensive recovery operations are attempted only if less intensive recovery operations fail. While RAID recovery can recover data more reliably than REH, RAID recovery can have a much longer duration (e.g., more than 4× longer) than REH.

This approach can result in improved memory device performance in non-severe error scenarios, but hinder memory device performance in severe error scenarios, because unsuccessful recovery operations will be applied before a more intensive successful recovery operation. For example, when data is successfully recovered with REH, the time between detecting the failure to recovering the data from the failed memory cells has a duration no shorter than the duration of REH. However, when REH is unsuccessful and a RAID recovery is required, the time between detecting the failure to recovering the data from the failed memory cells has a duration no shorter than the combined duration of REH and the RAID recovery, because RAID recovery is only triggered after REH is completed (i.e., unsuccessfully).

Aspects of the present disclosure address the above and other deficiencies by adaptively performing error recovery operations when a failure is detected based on memory device data state metrics. A "data state metric" herein refers to a quantity that is measured or inferred from the state of data stored on the memory device. Data state metrics can be used to characterize voltage distributions, and can reflect (i.e., is equal to or derived by a known transformation from) the state of slow charge loss, the degree of latent read disturb, the temporal voltage shift, and/or other measurable functions of the data state. For example, the data state metric can be represented by the raw bit error rate (RBER), which is the number of bit error experienced by a given data block per unit of time. Data state metrics can reflect the check failure bit (CFBit count) count and/or the check failure byte (CFByte count) count for a given set of memory cells. CFBit count reflects the number of non-conducting bitlines in the sensed data. CFByte count reflects the number of bytes in the sensed data that have at least one non-conducting bitline. In some embodiments, CFByte count can reflect the number of bytes in the sensed data where the last bitline of the byte is a non-conducting bitline.

Data state metrics can be returned to the memory subsystem controller or local media controller ("the controller") in response to a read strobe. "Read strobe" herein refers to an act of applying a read level voltage to a chosen wordline thus identifying the memory cells having their respective voltages below and/or above the applied read level. A read operation can include one or more read strobes. Upon performing a read strobe, the memory device can return one or more data state metrics (e.g., metadata values) that reflect the conductive state of a subset of bitlines that are connected to the memory cells forming at least a portion of a specified memory page. Accordingly, data state metrics can be generated for the whole memory page or only for a portion of the memory page.

In some embodiments, the controller can use data state metrics to adaptively select and attempt an error recovery operation that is more likely to successfully recover data from the failed memory cells than other available error recovery operations. Upon performing the read strobe, the data state metrics can be used by the controller to predict if a default recovery operation (i.e., REH) will successfully recover the data at the failed memory cells. If the data state metrics satisfy a threshold condition, the controller can predict that REH will successfully recover data from the failed memory cells, and subsequently perform the REH. If the data state metrics do not satisfy the threshold condition, the controller can predict that the REH will not succeed, and subsequently perform RAID recovery. In some embodiments, the controller can select an error recovery based on a read pattern of the failed memory cells. If the read pattern indicates that REH will be unable to recover the data at the failed memory cells, the controller can perform RAID recovery. In some embodiments, if the read pattern indicates that REH will be unlikely to recover the data at the failed memory cells, the controller can perform RAID recovery.

In this way, the controller can avoid performing unnecessary REH on failed memory cells whose data will not be recovered by REH. This in turn can improve the performance and reliability of the memory device by reducing down-time and unnecessary stressors (i.e., extraneous REH processes) to the failed memory cells, and memory device at large.

While the examples described herein involve triple level cell (TLC) voltage distributions, in various other implementations, similar techniques can be implemented for memory pages storing other numbers of bits per cell.

Figure 1:
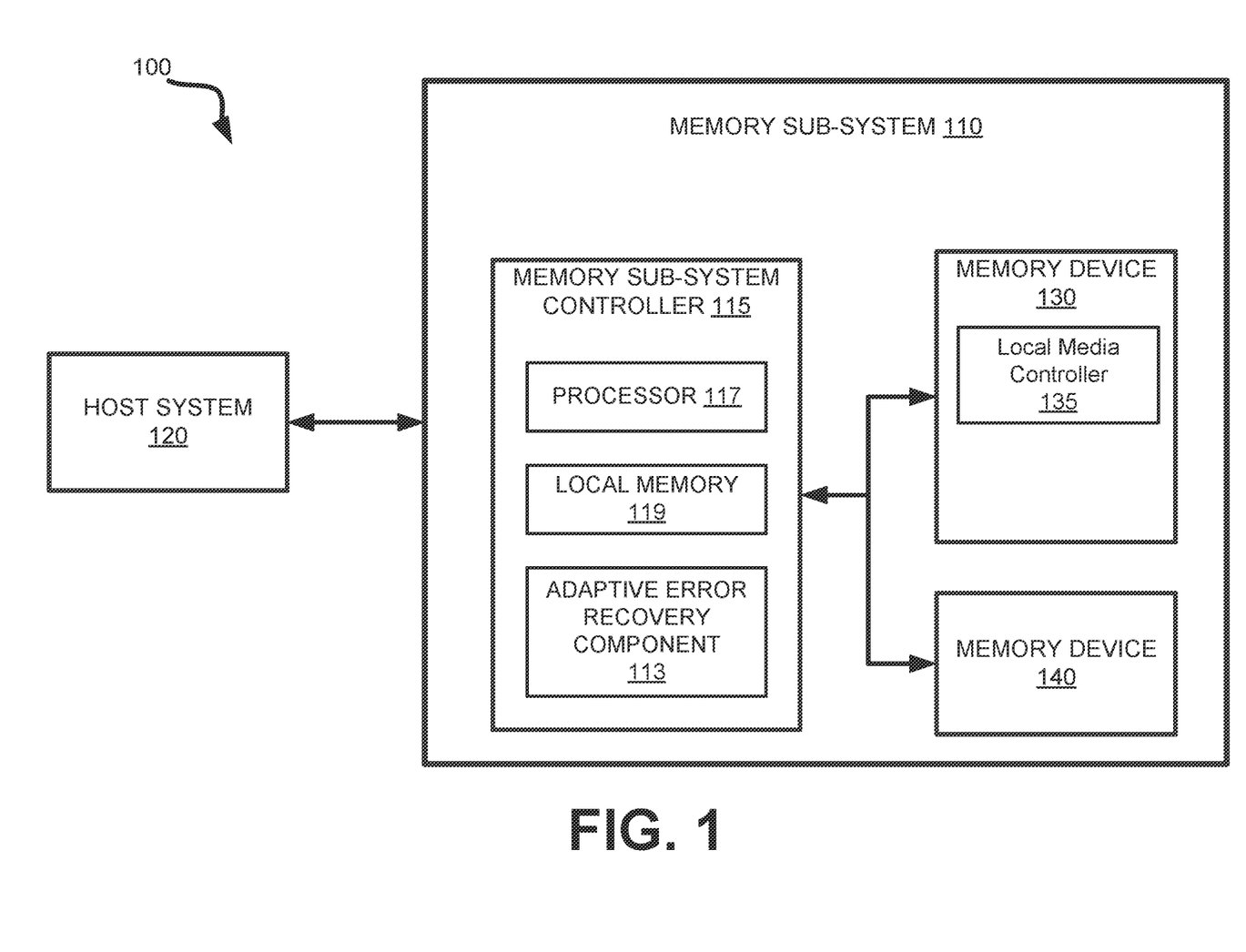
FIG. 1 illustrates an example computing system that includes a memory sub-system according to some embodiments of the present disclosure.

FIG. 1 illustrates an example computing system 100 that includes a memory sub-system 110 according to some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. As described above, one type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCS, PLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes adaptive error recovery component 113 that can select an error handling recovery operation for a detected failure of the memory device, based on data state metrics of the failed memory cells. In some embodiments, the memory sub-system controller 115 includes at least a portion of the adaptive error recovery component 113. In some embodiments, the adaptive error recovery component 113 is part of the host system 120, an application, or an operating system. In other embodiments, local media controller 135 includes at least a portion of adaptive error recovery component 113 and is configured to perform the functionality described herein. In some embodiments, adaptive error recovery component 113 is implemented using firmware, hardware components, or a combination of the above.

The adaptive error recovery component 113 can use data state metrics to select a recovery operation for a set of failed memory cells in memory device 130. In one embodiment, in response to a read strobe, adaptive error recovery component 113 can receive one or more data state metrics (e.g., metadata values) from memory device 130. In an illustrative example, adaptive error recovery component 113 can receive the CFByte count, and/or the CFBit count, for the failed memory cells. The data state metrics received by adaptive error recovery component 113 can be used by memory sub-system controller 115 or local media controller 135 to select and attempt a data recovery operation on the failed memory cells. Further details with regards to the operations of the adaptive error recovery component 113 are described below.

Figures 2A, 2B:
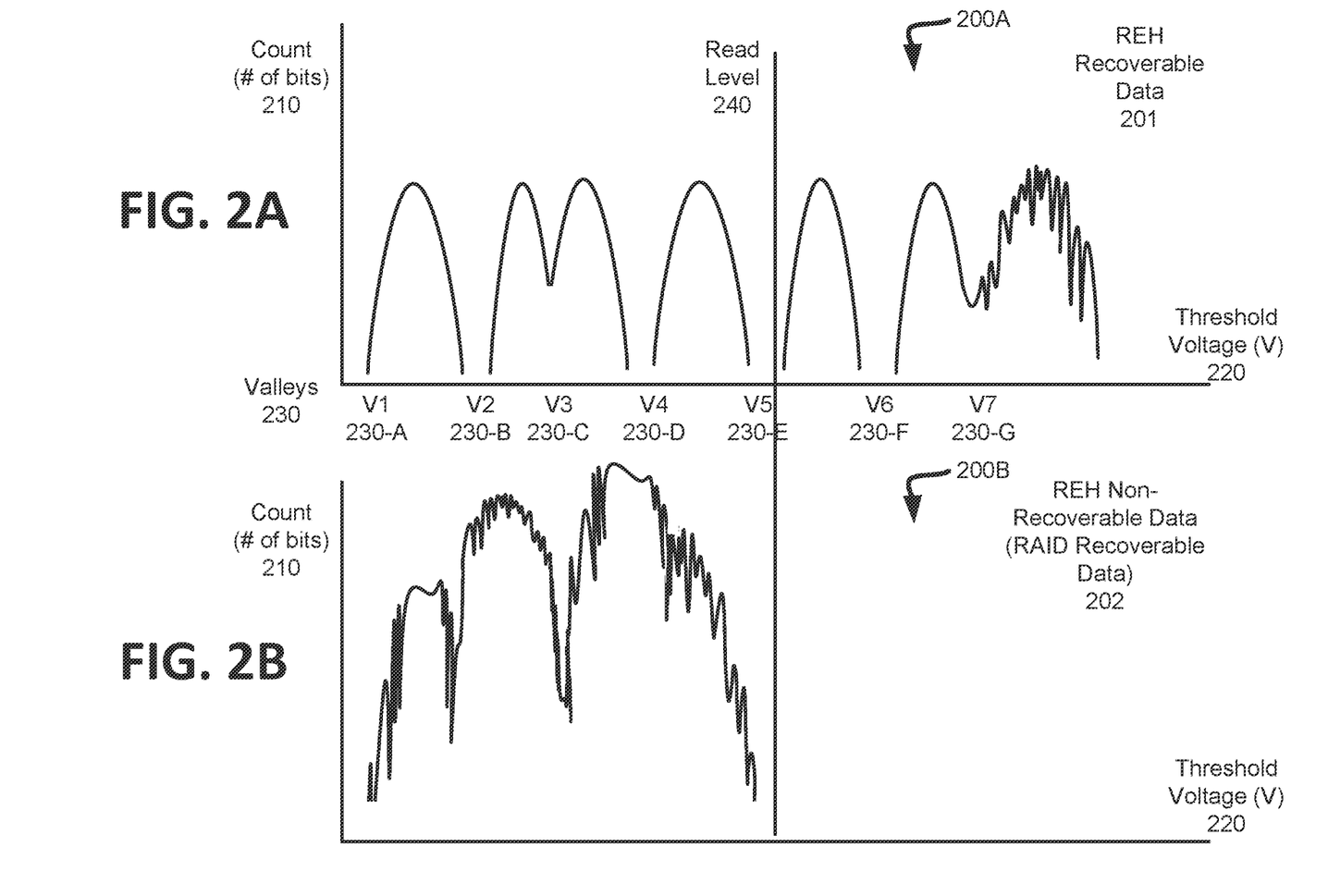
FIGS. 2A and 2B illustrate example voltage distribution graphs of failed memory cells as the cell count (# of bits) relative to the threshold voltage, according to some embodiments of the present disclosure.

FIGS. 2A and 2B illustrate example voltage distribution graphs 200A and 200B of failed memory cells as a cell count (# of bits) 210 relative to threshold voltage 220, according to some embodiments of the present disclosure. Voltage levels are between each of valleys 230 (e.g., between V1 230-A and V2 230-B, between V2 230-B and V3 230-C, etc.).

FIG. 2A depicts REH recoverable data 201. When the data state metric of the failed memory cells indicates an error such as is illustrated in FIG. 2A, REH can be used to recover data stored at the failed memory cells (e.g., data stored above V7 230-G in the illustrative example).

FIG. 2B depicts REH non-recoverable data (RAID recoverable data) 202. When the data state metric of the failed memory cells indicates an error such as is illustrated in FIG. 2B, REH cannot recover data stored at the failed memory cells (e.g., all data stored in illustrative example has been corrupted, and REH cannot recovery corrupted data). When REH cannot recover data stored at the failed memory cells, RAID recovery can be attempted to recover data stored at the failed memory cells by using recovery data distributed among other portions of the memory device. As described above, recovery data can be block-level striped, and can include redundancy data (e.g., duplicate data, parity data), error detection data (e.g., error detection codes, checksums, Cyclic Redundancy Check (CRC)), error correction data (e.g., error correcting code (ECC), forward error correction (FEC), erasure code), other data, or a combination thereof.

Read level 240 indicates a pre-selected voltage level. Failed memory cells with a low quantity of bits above read level 240 (i.e., zero bits in the illustrative example of FIG. 2B) are unlikely to have REH-recoverable data. A controller, such as memory sub-system controller 115 can perform a read strobe and/or read operation at read level 240, and based information received from performing the read strobe and/or read operation at read level 240, predict whether the data is REH-recoverable. The controller can then perform REH for data that is predicted to be REH-recoverable. Alternatively, the controller can perform RAID for data that is predicted to be non-REH recoverable.

Data from failed memory cells can be determined as REH-recoverable data if the information from the read strobe at read level 240 of the failed memory cells satisfies a threshold condition. As described above, read level 240 can be the voltage of the read strobe applied to the failed memory to identify the memory cells with respective voltages below and/or above the applied read level. Upon performing a read strobe, the memory device can return one or more data state metrics (e.g., metadata values) that reflect the conductive state of a subset of bitlines that are connected to the memory cells forming at least a portion of a specified memory page. In some embodiments, the read strobe can return one or more data state metrics that reflect the programmed and/or erased state of the failed memory cells. Data can be REH-recoverable data if the data state metrics returned by performing a read at read level 240 satisfy the threshold condition. Thus, with information from the read strobe and subsequent comparisons to expected information about the set of failed memory cells, non-REH recoverable data can be identified. In some embodiments, the threshold condition can be based on memory device type, per-cell memory density of the memory cells, and/or other memory device or manufacturing conditions. In some embodiments, the voltage of read level 240 can be pre-determined based on memory device type, per-cell memory density of the memory cells of the memory device, and/or other memory device or manufacturing conditions. In some embodiments, the threshold condition and/or voltage of read level 240 can be defined during production of the memory device in a manufacturing environment.

Read level 240 can be selected as a middle valley of valleys 230 for the set of failed memory cells. In some embodiments, the middle valley can be a center valley, or a near center valley (e.g., +1) of the voltage distribution. For example, in a TLC memory device, valley 4 (e.g., V4 230-D) can be the center valley of the 7 valleys 230, and valley 5 (e.g., V5 230-E) can be a near-center valley of the 7 valleys 230. In some embodiments, read level 240 can be at V5 230-E of a TLC memory device (as shown in FIGS. 2A-B). In some embodiments, read level 240 can be at valley V4 230-D of a TLC memory device. In some embodiments, the data state metrics can reflect the CFBit count above read level 240, and the threshold condition can reflect an expected CFBit count above read level 240. In some embodiments, the data state metrics can reflect a quantity of non-programmed cells (e.g., erased memory cells, and/or failed memory cells) above read level 240, and the threshold condition can reflect an expected quantity of non-programmed cells above read level 240. Further details with regard to the position of read level 240 for the CFBit count data state metrics are described below with respect to FIG. 3.

In some embodiments, read level 240 can correspond to the valley below the last bit of the lowest page of valleys 230. For example, as described above, voltage thresholds can correspond to various page types; V1 230-A and V5 230-E can correspond to LPs, V2 230-B, V4 230-D, and V6 230-F can correspond to UPs, and V3 230-C and V7 230-G can correspond to XPs. Thus, in a TLC memory device with the above described pages, the read level can be at V5 230-E, as V5 230-E is the valley 230 below the last bit of the lowest page. In some embodiments, the data state metrics can reflect the CFByte count and an expected CFByte count. In some embodiments, the CFByte count can reflect the quantity of bytes in the sensed data where the bitline(s) of the byte above read level 240 are non-conducting bitlines (e.g., the last bitline of the byte, or highest bit of the lowest page type). Further details with regard to the position of read level 240 for the CFByte count data state metrics are described with respect to FIG. 4.

Figure 3:
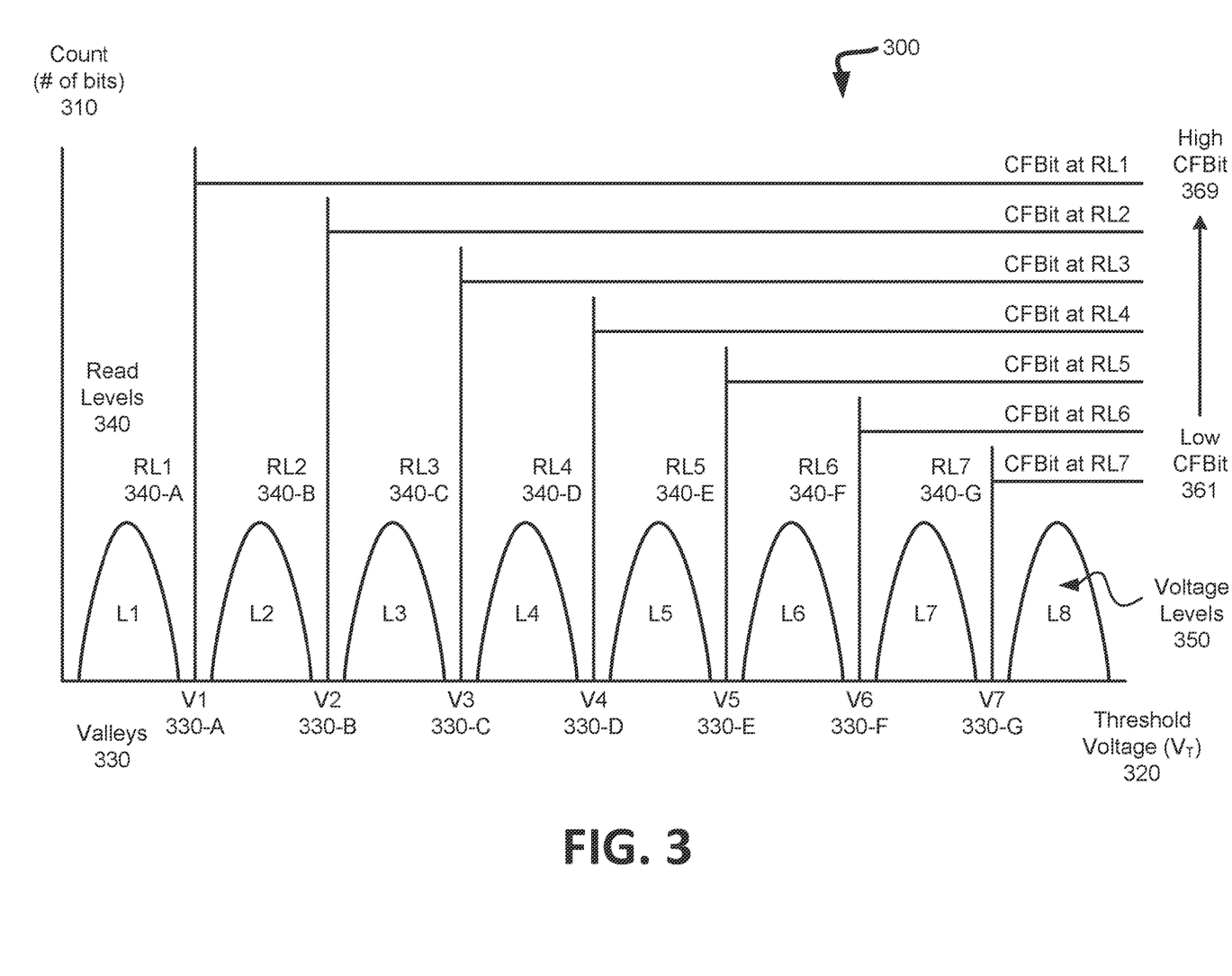
FIG. 3 illustrates an example voltage distribution graph with corresponding CFBit counts at each read level, according to some embodiments of the present disclosure.

FIG. 3 illustrates an example voltage distribution graph 300 with corresponding CFBit counts at each read level, according to some embodiments of the present disclosure. Voltage levels 350 (L1-L8) are depicted as a count (# of bits) 310 at each threshold voltage (VT) 320 for a set of memory cells. Valleys 330 (V1-V7, 330-A to 330-G respectively) represent the voltages between voltage levels 350 with the least number of bits 310. Read levels 340 (RL1-RL7, 340-A to 340-G respectively) correspond to valleys 330. In some embodiments, read levels 340 correspond to the center of each respective valley 330. As shown in FIG. 3, the maximum CFBit count decreases as the read level increases. That is, a maximum CFBit count at RL1 340-A (the read level corresponding to V1) is greater than a maximum CFBit count at RL2 340-B, which is greater than a maximum CFBit count at RL3 at 340-C, etc. In some embodiments, CFBit count at RL1 340-A can reflect a high read level CFBit count 369 for the set of memory cells on a TLC memory device, and the CFBit count at RL7 340-G can reflect a low read level CFBit count 361 for the set of memory cells on a TLC memory device. In some embodiments, a read level such as read level 240 as described with respect to FIG. 2, can correspond to any of read levels 340 (RL1-RL7, 340-A to 340-G respectively). In some embodiments, a read level such as read level 240 can correspond to a read level 340 which have a quantity of valleys 330 below the read level 340 equal to a quantity of valleys 330 above the read level 340. For example, read level RL4 340-D in V4 330-D has 3 valleys below the read level, (i.e., V1 330-A, V2 330-B, and V3 330-C), and 3 valleys above the read level (i.e., V5 330-E, V6 330-F, and V7 330-G). The read level can be selected from read levels 340 based on memory device characteristics and/or operating conditions. In some embodiments, the read level can be selected based on desired threshold condition characteristics. For example, it may be desirable for the memory device to correspond to a certain CFBit count, and thus the read level would be selected to correspond to the CFBit count threshold condition).

Figure 4:
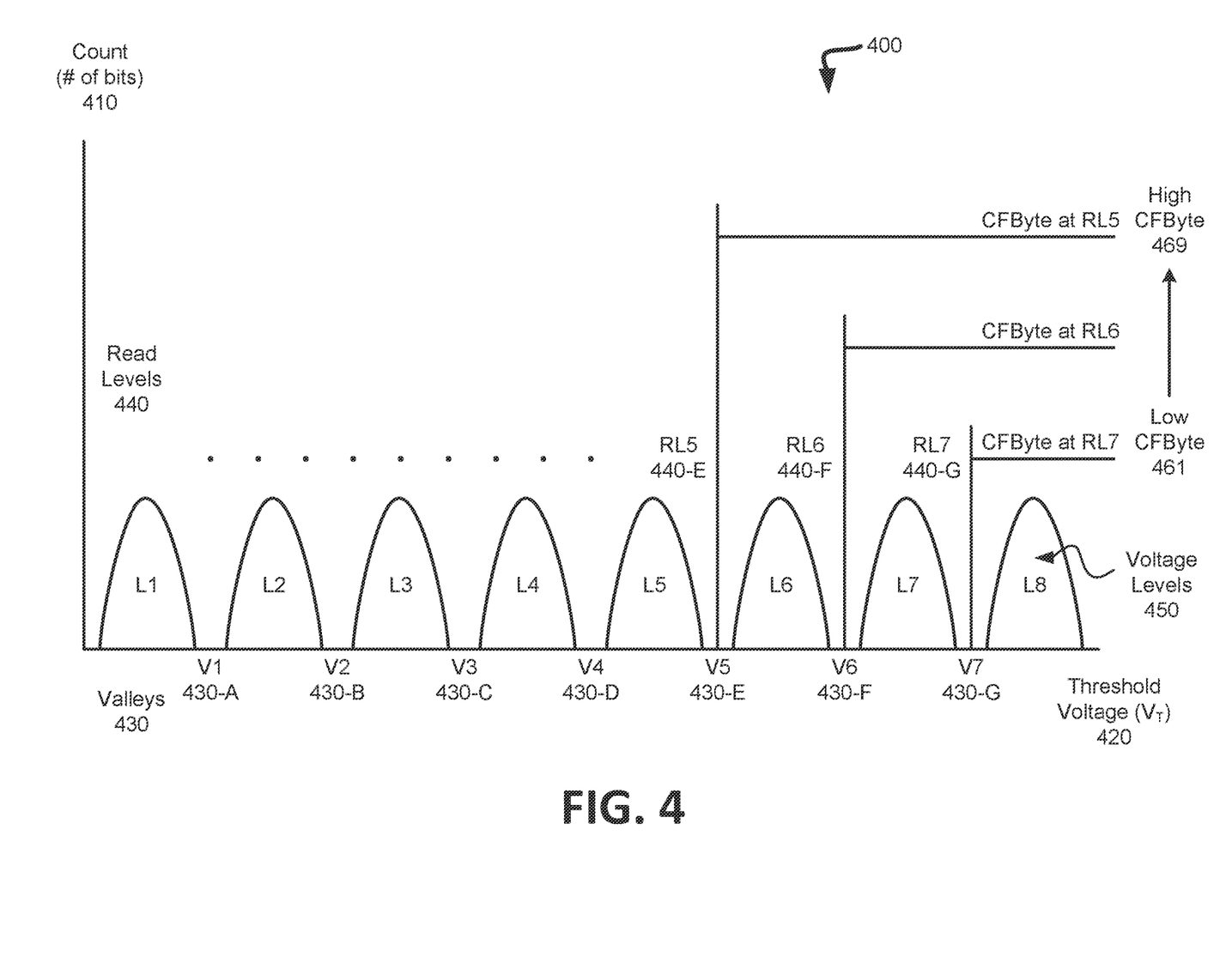
FIG. 4 illustrates an example voltage distribution graph with corresponding CFByte counts at each read level, according to some embodiments of the present disclosure.

FIG. 4 illustrates an example voltage distribution graph 400 with corresponding CFByte counts at each read level, according to some embodiments of the present disclosure. Voltage levels 450 (L1-L8) are depicted as a count (# of bits) 410 at each threshold voltage (VT) 420. Valleys 430 (V1-V7, 330-A to 330-G respectively) represent the voltages between voltage levels 350 with the least quantity of bits 410. Read levels 440 (RL1-RL7, 440-A to 440-G respectively) correspond to valleys 430. In some embodiments, read levels 440 can correspond to the center of each respective valley 430.

As shown in FIG. 4, the maximum CFByte count decreases as the read level increases. That is, a maximum CFByte count at RL5 440-E (the read level corresponding to V5 430-E) is greater than a maximum CFByte count at RL6 440-F, which is greater than a maximum CFByte count at RL7 at 440-G. In some embodiments, CFByte count at RL5 440-E can reflect a high read level CFByte count 469 for the set of memory cells on a TLC memory device, and CFByte count at RL7 440-G can reflect a low read level CFByte count 461 for the set of memory cells on a TLC memory device. In some embodiments, a read level (e.g., such as read level 240 as described with respect to FIG. 2), can correspond to a read level 340 with the highest possible CFByte count (i.e., in this illustrative example, RL5 440-E in valley V5 430-E). In some embodiments, a read level such as read level 240 can correspond to the valley 430 associated with the last bit of a lowest page type of the set of memory cells. For example, in the illustrative example, the read level can correspond to valley V5 430-E, which is associated with the last bit of a lower logical page (LP) of the set of memory cells.

Figure 5A:
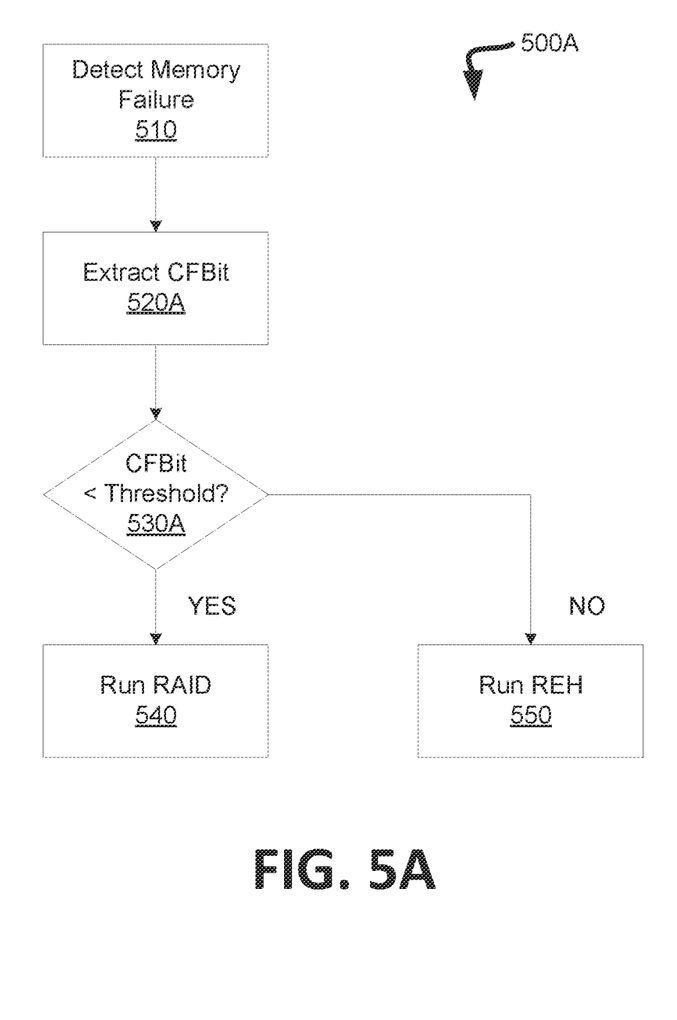
FIGS. 5A and 5B are flow diagrams of example methods to adaptively select an error recovery operation, according to some embodiments of the present disclosure.
Figure 5B:
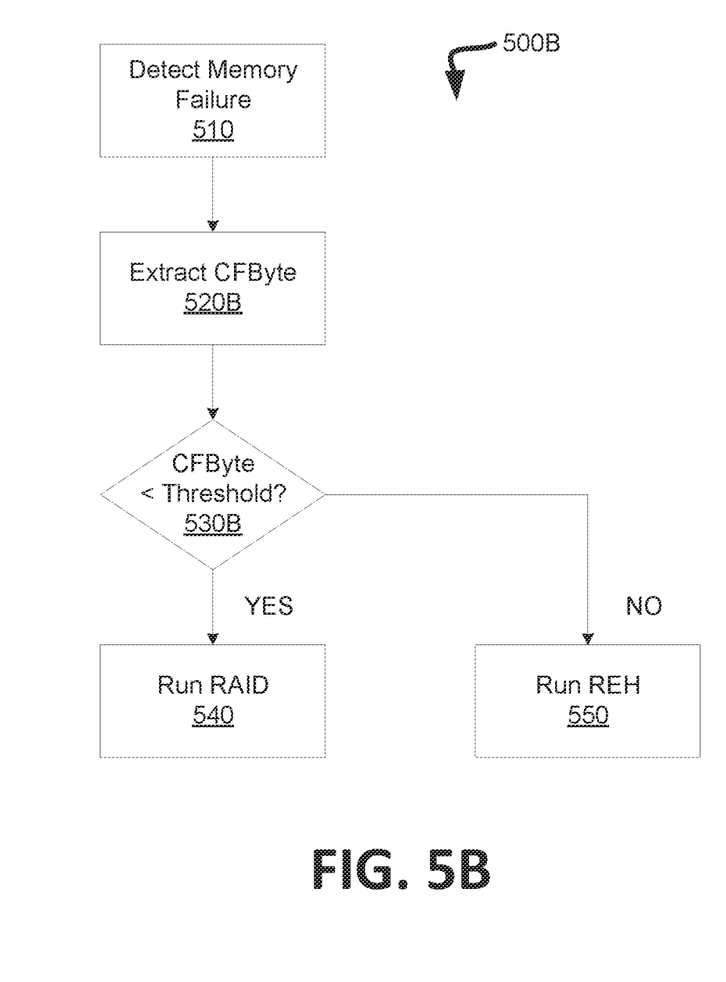

FIGS. 5A and 5B are flow diagrams of example methods 500A and 500B respectively to adaptively select an error recovery operation, according to some embodiments of the present disclosure. Methods 500A and/or 500B can be performed by processing logic that can include hardware (e.g., processing device, circuitry, dedicated logic, programmable logic, microcode, hardware of a device, integrated circuit, etc.), software (e.g., instructions run or executed on a processing device, such as firmware), or a combination thereof. In some embodiments, methods 500A and/or 500B are performed by the adaptive error recovery component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the controller implementing either method 500A or method 500B detects a memory failure. The memory failure can correspond to a set of memory cells of the memory device (e.g., failed memory cells). Upon detecting the failure, the controller can initiate an error handling process. In some embodiments, the error handling process can include data recovery operations such as operations 520A/B-550 as described below. In some embodiments, data recovery can be separate from the error handling process. Memory failures can include for example, failed read operations, failed write operation, interrupted memory operations, etc. The controller can have a default error handling process, including a default data recovery operation. In some embodiments, the default error handling process can be REH.

The controller can attempt to identify and correct the failure by using data state metrics received in response to applying a read strobe the failed memory cells. As described above, data state metrics can reflect the state of slow charge loss, the degree of latent read disturb, the temporal voltage shift, and/or other measurable functions of the data state. For example, the data state metric can be represented by the raw bit error rate (RBER), which is the number of bit errors experienced by a given data block per unit of time, the failed byte count (CFByte count), and/or the failed bit count (CFBit count) for a given set of memory cells. In some embodiments, the controller can apply multiple read strobes to the failed memory cells. In some embodiments, the controller can compare the data state metrics received from multiple read strobes and can evaluate the data state metrics of the combination of data state metrics.

At operation 520A in 500A, the controller extracts the CFBit count from the data state metrics. In some embodiments, the controller might not perform mathematical operations on data state metrics to extract the CFBit count.

At operation 520B in 500B, the controller extracts the CFByte count from the data state metrics. In some embodiments, the controller might not perform mathematical operations on data state metrics to extract the CFByte count.

At operation 530A in 500A, the controller determines whether the CFBit count (e.g., the failure count) satisfies a threshold condition. In one embodiment, the CFBit count satisfies the threshold condition when the CFBit count is greater than a corresponding threshold value. The threshold value is an expected CFBit count based on the read level (e.g., such as read level 240 as described with respect to FIG. 1) of the read strobe from the controller. In some embodiments, the read level for CFBit count can be a predetermined read level based on memory device characteristics. In some embodiments, the controller can determine a read level based on memory device conditions.

At operation 530B in 500B, the controller determines whether the CFByte count (e.g., the failure count) satisfies a threshold condition. In one embodiment, CFByte count satisfies the threshold condition when CFByte count is greater than a corresponding threshold value. The threshold value is an expected CFByte count based on the read level (e.g., such as read level 240 as described with respect to FIG. 1) of the read strobe from the controller. In some embodiments, the read level for CFByte count can be a predetermined read level based on memory device characteristics. In some embodiments, the controller can determine a read level based on memory device conditions.

At operation 540, responsive to determining that either failure count (i.e., CFBit count or CFByte count) satisfies the threshold condition, the controller runs RAID on the failed memory cells. As described above, RAID can reconstruct data at the failed memory cells using recovery data. Recovery data can be block-level striped, and can include redundancy data (e.g., duplicate data, parity data), error detection data (e.g., error detection codes, checksums, Cyclic Redundancy Check (CRC)), error correction data (e.g., error correcting code (ECC), forward error correction (FEC), erasure code), other data, or a combination thereof. In some embodiments, RAID can recover corrupted data from failed memory cells. In some embodiments, the controller can have a preference of running RAID when REH might not recover data from the failed memory cells.

At operation 550, responsive to determining that either failure count (i.e., CFBit count or CFByte count) does not satisfy the threshold condition, the controller runs REH on the failed memory cells. As described above, REH can include operations such as read retry, coarse threshold estimation (CTE), auto read calibration (ARC), or soft-decision decoding (e.g., 1 hard bit (H)/2 soft bits (S) (1H2S)). The read error handling can recover data using an obtained read level. REH can recover data from failed memory cells where charge levels have degraded over time, such as because of slow charge loss and/or read disturb. In some embodiments, REH can recover data from failed memory cells, where memory cell failure is not from charge level degradation. In some embodiments, REH can be the default error handling operation in response to detecting an error.

Figure 6:
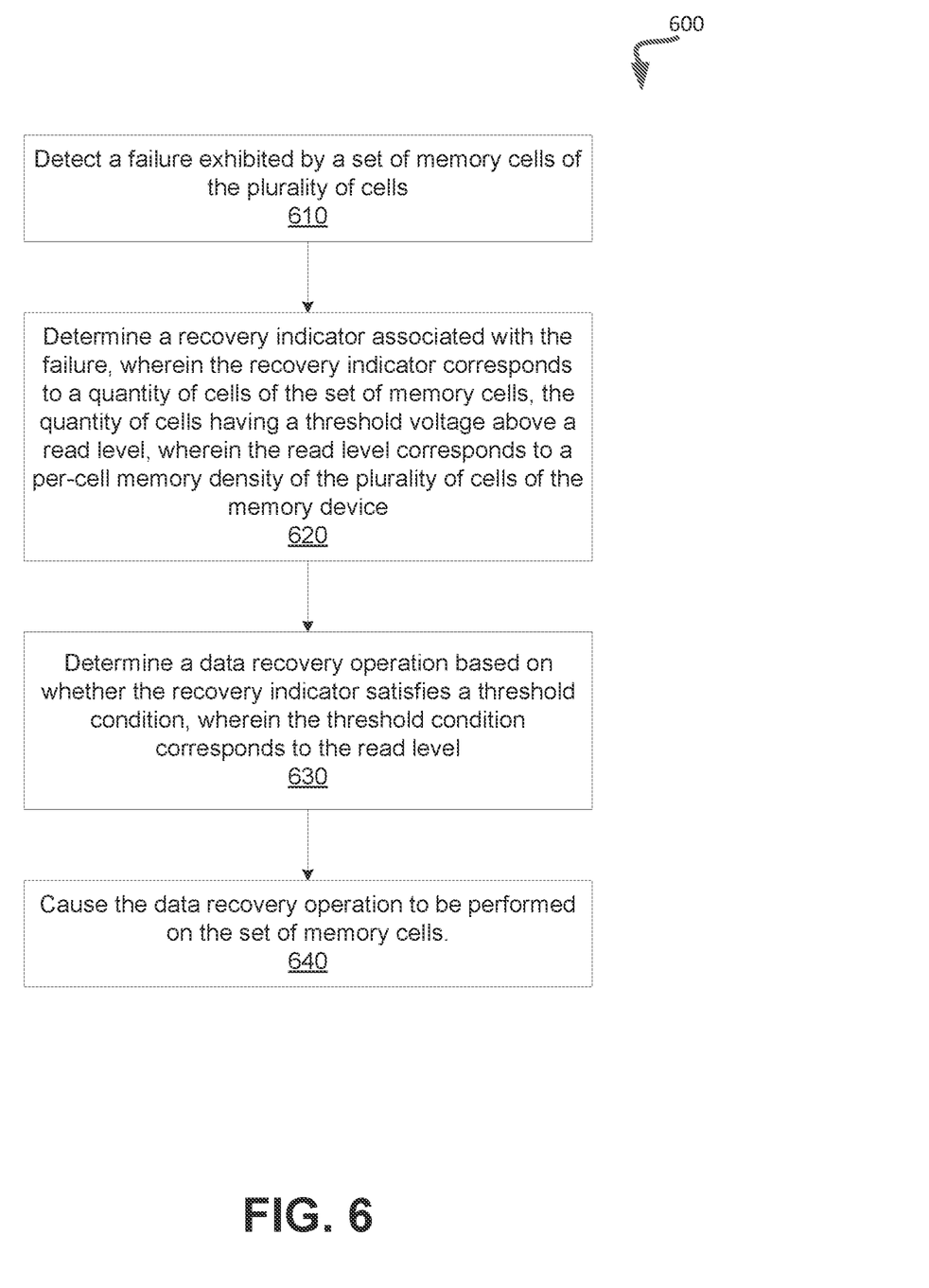
FIG. 6 is a flow diagram of an example method to adaptively select an error recovery operation, according to some embodiments of the present disclosure.

FIG. 6 is a flow diagram of example method 600 to adaptively select an error recovery operation, according to some embodiments of the present disclosure. Method 600 can be performed by processing logic that can include hardware (e.g., processing device, circuitry, dedicated logic, programmable logic, microcode, hardware of a device, integrated circuit, etc.), software (e.g., instructions run or executed on a processing device, such as firmware), or a combination thereof. In some embodiments, method 600 is performed by the adaptive error recovery component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the controller implementing method 600 detects a failure exhibited by a set of memory cells of the plurality of cells. The failure can be in response to a memory operation (e.g., a program operation, read operation, etc.). In some embodiments, the failure can be in response to memory device health checks and operations such as media scans, garbage collection, etc. In some embodiments the failure can correspond to a host initiated task. In some embodiments, the failure can correspond to background tasks initiated by the controller, such as sub-system memory controller 115 or media controller 135 as described with respect to FIG. 1. Upon detecting a failure, the controller can issue a program status failure flag. The cause of the failure can be unknown at the time the failure is detected. The controller can implement an error handling process in response to detecting the failure and/or in response to the program status failure flag. In some embodiments, the error handling process can include error detection operations, such as, for example, operations to detect whether data at the failed memory cells can be recovered by REH.

At operation 620, the controller determines a recovery indicator associated the failure, wherein the recovery indicator corresponds to a subset of cells of the set of memory cells, the subset of cells having a threshold voltage above a read level, wherein the read level corresponds to a per-cell memory density of the plurality of cells of the memory device. The recovery indicator can be a predictive value. When the value of the subset of cells having the threshold voltage above the read level is larger, the predictive value of the recovery indicator can reflect that the failed memory cells are more likely to contain data recoverable by a default data recovery operation (i.e., REH). The recovery indicator can correspond to a failure count for the set of failed memory cells. In some embodiments, the failure count can reflect a CFBit count for the set of failed memory cells. In some embodiments, the failure count can reflect a CFByte count for the failed memory cells. The recovery indicator can correspond to an expected failure count for the cells above the read level. In some embodiments, the expected failure count can reflect an expected CFBit count. In some embodiments, the expected failure count can reflect an expected CFByte count. In some embodiments, the controller can determine the CFByte count by checking the last bit of each page of the set of memory cells for failed bits. For example, if a highest programmed bit (e.g., a last programmed bit) of a page is not programmed, the page can be a failed byte, and thus contribute to the CFByte count.

The per-cell memory density of the plurality of cells can refer to a SLC, MLC, TLC, and/or QLC. The read level can be selected based on the per-cell memory density, as discussed above in FIGS. 2-4. In some embodiments, the read level for a set of TLC memory cells can correspond to valley 5 (V5). In some embodiments, the read level for a set of TLC memory cells can correspond to valley 4 (V4). While a set of TLC memory cells are discussed herein, it should be appreciated that these operations can apply to other per-cell memory density memory devices. For example, the read level for a set of QLC memory cells can correspond to valley 7 (V7), and/or valley 12 (V12) in like manner.

With a read strobe and/or read operation of the failed memory cells, the controller can determine data state metrics corresponding to the recovery indicator. Because a read strobe/read operation has a duration much shorter than REH, the additional read before starting REH can have a minimal effect on system performance. In some embodiments, the controller can store the data state metrics from the read strobe and/or read operation of the failed memory cells. In some embodiments, the stored data state metrics can be used by the controller during a recovery operation (e.g., during REH and/or RAID). The data state metrics can reflect conditions of the memory cells. In some embodiments, the conditions of the memory cells can be interpreted with numerical indicators such as CFBit count, CFByte count, RBER, etc.

At operation 630, the controller determines a data recovery operation based on whether the recovery indicator satisfies a threshold condition, wherein the threshold condition corresponds to the read level. The controller can have a default recovery operation. In some embodiments, the default recovery operation can be REH. The controller can apply the default recovery operation if the recovery indicator does not satisfy the threshold condition. In some embodiments, the controller might not have a default recovery operation, and can only select recovery operations in response to determining whether the threshold condition is satisfied, or the threshold condition is not satisfied. The controller can select REH if the recovery indicator does not satisfy the threshold condition. The controller select RAID if the recovery indicator does satisfy the threshold condition. In some embodiments, the recovery indicator and threshold condition can correspond to CFBit counts. In some embodiments, the recovery indicator and threshold condition can correspond to CFByte counts. In some embodiments, the recovery indicator and threshold condition can correspond to multiple numerical representations of data state metrics. For example, the recovery indicator and threshold condition can each reflect a CFBit count and a CFByte count, and the threshold condition can be satisfied if the recovery indicator CFBit count and CFByte count each satisfy the threshold condition CFBit count expected value and CFByte count expected value respectively.

The threshold condition can depend on the read level, such as is described in FIGS. 3-4. That is, if the read level changes, the threshold condition can change accordingly. For example, if the read level is at valley V5 of a TLC, an expected CFBit count of the threshold condition can be smaller than if the read level is at valley V4 of a TLC.

At operation 640, the controller causes the data recovery operation to be performed on the set of memory cells. The controller can perform the determined (e.g., selected) data recovery operation of operation 630. In some embodiments, the controller can cause the data recovery operation to be performed by another component of the memory sub-system such as memory sub-system 110 as described with respect to FIG. 1. In some embodiments, the controller can directly perform the data recovery operation on the failed memory cells. Responsive to the recovery indicator not satisfying the threshold condition, the controller can perform a RAID recovery operation. Responsive to the recovery indicator satisfying the threshold condition, the controller can perform a REH recovery operation.

Figure 7:
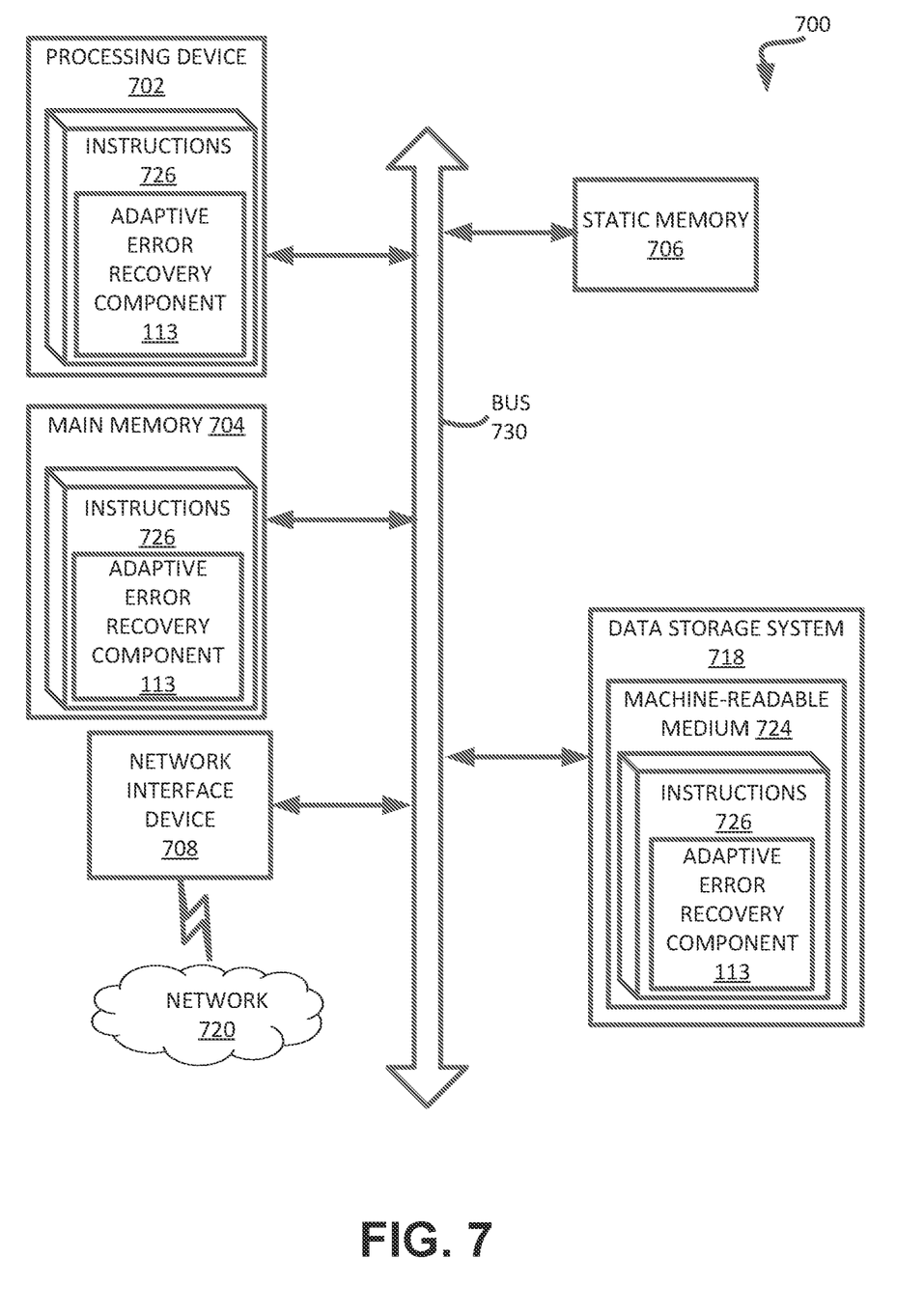
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the adaptive error recovery component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch, or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to an adaptive error recovery component (e.g., the adaptive error recovery component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In some embodiments, the "machine-readable storage medium" can be a "non-transitory computer-readable storage medium."

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic, or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of cells; and
a processing device, operatively coupled with the memory device, the processing device to perform operations comprising:
detecting a failure exhibited by a set of memory cells of the plurality of cells;
determining a recovery indicator associated with the failure, wherein the recovery indicator corresponds to a subset of cells of the set of memory cells, the subset of cells having a threshold voltage above a read level, wherein the read level corresponds to a per-cell memory density of the plurality of cells of the memory device;
determining a data recovery operation based on whether the recovery indicator satisfies a threshold condition, wherein the threshold condition corresponds to the read level; and
causing the data recovery operation to be performed on the set of memory cells.

2. The system of claim 1, wherein performing the data recovery operation further comprises:
responsive to the recovery indicator satisfying the threshold condition, causing a redundant array of independent disks (RAID) recovery operation to be performed on the set of memory cells.

3. The system of claim 2, wherein the recovery indicator satisfies the threshold condition when a failure count for the subset of cells is greater than or equal to an expected failure count.

4. The system of claim 3, wherein the failure count comprises a check failed bit (CFBit) count.

5. The system of claim 3, wherein the read level corresponds to a threshold voltage of a highest programmed bit of a first page type of a plurality of page types of the memory device, wherein the plurality of page types corresponds to the per-cell memory density of the plurality of cells of the memory device, and wherein the failure count comprises a check failed byte (CFByte) count.

6. The system of claim 1, wherein performing the data recovery operation further comprises:
responsive to the recovery indicator not satisfying the threshold condition, causing a read error handling (REH) recovery operation to be performed on the set of memory cells.

7. The system of claim 6, wherein the recovery indicator does not satisfy the threshold condition when a failure count of the subset of cells is less than an expected failure count.

8. The system of claim 1, wherein the threshold condition is defined during production of the memory device.

9. A method comprising:
detecting, by a processing device, a failure exhibited by a set of memory cells of a plurality of cells of a memory device;
determining a recovery indicator associated with the failure, wherein the recovery indicator corresponds to a subset of cells of the set of memory cells, the subset of cells having a threshold voltage above a read level, wherein the read level corresponds to a per-cell memory density of the plurality of cells of the memory device;
determining a data recovery operation based on whether the recovery indicator satisfies a threshold condition, wherein the threshold condition corresponds to the read level; and
causing the data recovery operation to be performed on the set of memory cells.

10. The method of claim 9, wherein performing the data recovery operation further comprises:
responsive to the recovery indicator not satisfying the threshold condition, causing a redundant array of independent disks (RAID) recovery operation to be performed on the set of memory cells.

11. The method of claim 10, wherein the recovery indicator satisfies the threshold condition when a failure count for the subset of cells is greater than or equal to an expected failure count.

12. The method of claim 11, wherein the failure count comprises a check failed bit (CFBit) count.

13. The method of claim 11, wherein the read level corresponds to a threshold voltage of a highest programmed bit of a first page type of a plurality of page types of the memory device, wherein the plurality of page types corresponds to the per-cell memory density of the plurality of cells of the memory device, and wherein the failure count comprises a check failed byte (CFByte) count.

14. The method of claim 9, wherein performing the data recovery operation further comprises:
   responsive to the recovery indicator not satisfying the threshold condition, causing a read error handling (REH) recovery operation to be performed on the set of memory cells.

15. The method of claim 14, wherein the recovery indicator does not satisfy the threshold condition when a failure count of the subset of cells is less than an expected failure count.

16. The method of claim 9, wherein the threshold condition is defined during production of the memory device.

17. A non-transitory computer-readable storage medium comprising instructions that, when executed by a processing device, cause the processing device to perform operations comprising:
   detecting, by the processing device, a failure exhibited by a set of memory cells of a plurality of cells of a memory device;
   determining a recovery indicator associated with the failure, wherein the recovery indicator corresponds to a subset of cells of the set of memory cells, the subset of cells having a threshold voltage above a read level, wherein the read level corresponds to a per-cell memory density of the plurality of cells of the memory device;
   determining a data recovery operation based on whether the recovery indicator satisfies a threshold condition, wherein the threshold condition corresponds to the read level; and
   causing the data recovery operation to be performed on the set of memory cells.

18. The non-transitory computer-readable storage medium of claim 17, wherein performing the data recovery operation further comprises:
   responsive to the recovery indicator satisfying the threshold condition, causing a redundant array of independent disks (RAID) recovery operation to be performed on the set of memory cells.

19. The non-transitory computer-readable storage medium of claim 17, wherein performing the data recovery operation further comprises:
   responsive to the recovery indicator not satisfying the threshold condition, causing a read error handling (REH) recovery operation to be performed on the set of memory cells.

20. The non-transitory computer-readable storage medium of claim 17, wherein the threshold condition is defined during production of the memory device.

* * * * *